(12) United States Patent
Ocondi et al.

(10) Patent No.: US 8,633,830 B2
(45) Date of Patent: Jan. 21, 2014

(54) INTELLIGENT UNIVERSAL WIRELESS ADAPTER

(75) Inventors: Cham Ocondi, Aurora, CO (US); Larry J. Compton, Castle Rock, CO (US); Mark Ocondi, Aurora, CO (US)

(73) Assignee: Wixxi Technologies, LLC, Castle Rock, CO (US)

( * ) Notice: Subject to any disclaimer, the term of this patent is extended or adjusted under 35 U.S.C. 154(b) by 552 days.

(21) Appl. No.: 12/898,818

(22) Filed: Oct. 6, 2010

(65) Prior Publication Data

US 2012/0086580 A1    Apr. 12, 2012

(51) Int. Cl.
*G01V 3/00* (2006.01)

(52) U.S. Cl.
USPC .................................. 340/853.3; 340/853.2

(58) Field of Classification Search
USPC ......... 340/853.1, 870.01, 854.7, 853.2, 853.3
See application file for complete search history.

(56) References Cited

U.S. PATENT DOCUMENTS

| | | | |
|---|---|---|---|
| 5,983,164 A | 11/1999 | Ocondi | |
| 6,446,014 B1 | 9/2002 | Ocondi | |
| 7,446,673 B2 | 11/2008 | Ocondi | |
| 7,649,473 B2 * | 1/2010 | Johnson et al. | 340/853.1 |
| 7,733,240 B2 * | 6/2010 | Hall et al. | 340/853.2 |
| 2006/0022839 A1 * | 2/2006 | Hall et al. | 340/853.1 |
| 2006/0033637 A1 * | 2/2006 | Hall et al. | 340/853.1 |
| 2007/0241931 A1 | 10/2007 | Compton et al. | |
| 2009/0189777 A1 * | 7/2009 | Johnson et al. | 340/853.7 |
| 2010/0051110 A1 | 3/2010 | Ocondi | |
| 2010/0101774 A1 | 4/2010 | Ocondi et al. | |
| 2011/0060472 A1 | 3/2011 | Ocondi et al. | |
| 2012/0268288 A1 * | 10/2012 | Cousin et al. | 340/854.7 |

FOREIGN PATENT DOCUMENTS

| | | |
|---|---|---|
| CA | 2582744 | 7/2010 |
| WO | 2004040828 A2 | 5/2004 |
| WO | 2008127845 A1 | 10/2008 |
| WO | 2010051187 A1 | 5/2010 |

* cited by examiner

*Primary Examiner* — Albert Wong
(74) *Attorney, Agent, or Firm* — Dorsey & Whitney LLP

(57) ABSTRACT

A system for communication in an oil and gas well, the system including a controller, a first universal wireless adapter (UWA) wirelessly coupled to the controller, where the UWA is coupled to a first field device, a second UWA wirelessly coupled to the controller, where the UWA is coupled to a second field device, where the controller passes a control token among the first and second UWAs based upon communication traffic between the first and second UWA and the first and second field devices respectively. In some embodiments, this control token may be passed between the first and second UWAs depending upon communications between the respective UWAs and their field devices. For example, in the event that communication traffic is greater between the first UWA and the first field device, then the control token is passed to the first UWA.

30 Claims, 6 Drawing Sheets

INTELLIGENT UNIVERSAL WIRELESS ADAPTER

CROSS-REFERENCE TO RELATED APPLICATIONS

This application is related to and incorporates by reference commonly owned U.S. patent application Ser. No. 12/260,907 titled MEASUREMENT AND CONTROL OF LIQUID LEVEL IN WELLS, which was filed on Oct. 29, 2008.

This application is related to and incorporates by reference commonly owned Provisional U.S. Patent Application Ser. No. 61/094,274 titled GAS ACTUATED VALVE, which was filed on Sep. 4, 2008. This application is related to and incorporates by reference commonly owned Provisional U.S. Patent Application Ser. No. 61/094,485 titled GAS ACTUATED VALVE, which was filed on Sep. 5, 2008. This application is related to and incorporates by reference commonly owned U.S. patent application Ser. No. 12/552,630 titled GAS ACTUATED VALVE, which was filed on Sep. 2, 2009.

BACKGROUND OF THE INVENTION

I. Technical Field

The present invention relates generally to wells, and more particularly to wireless communication systems in oil and gas wells.

II. Background Discussion

Oil and gas wells are ubiquitous in the petroleum industry. Conventional oil and gas wells may include various field devices coupled to the well for monitoring (sometimes call field instrument devices) and for control purposes (sometimes called field control devices). These field devices may be monitored and/or controlled by a controller, which is sometimes referred to as a remote terminal unit (RTU). For example, in the oil and gas context, field devices coupled to the well may monitor the liquid levels of tanks containing oil or contaminated water, and in response to measurements from the field monitoring devices, the RTU may actuate certain field control devices such as valves when the measurements indicate that the tanks exceed a predetermined level. In this example, if the RTU cannot shut off the well and the tanks overflow, there could be environmental hazards. Furthermore, in the more general control context, if the RTU is unable to control the well by shutting it on or off at the right time, then production from the well may be undesirably disrupted. Thus, the ability of the RTU to communicate with the various field devices coupled to the well is important.

In some situations, such as where the RTU and the various field devices are in close physical proximity to each other (e.g., within 15-50 feet of each other) the RTU and the field devices may be directly coupled to each other via wiring. However, there are a number of reasons why such a physical connection may not be practical or economically feasible. First, in conventional systems, where greater monitoring and control capabilities are desired, the number of field devices often increases with time making physical connection between the controller and each field device difficult and/or cost prohibitive. Second, the distances between these field devices and the RTU may be too far physically to directly connect the field devices to the RTU with wiring, even if the RTU is centrally positioned between the various field devices. This problem is only exacerbated by an increasing number of field devices. Third, even if the RTU and a field device are in close physical proximity to each other, there may be reasons why they cannot be reasonably physically connected with wiring. For example, because of the potentially flammable nature of the oil or gas from the well, caution must be exercised when routing electrical wiring between the RTU and field devices, such as by adequately burying and grounding these electrical wires. However, it may be unfeasible to dig trenches for underground burial of these wires because of piping or other underground structures that would interfere with the installation. Thus, physical connectivity between the RTU and the field devices can be challenging to implement and can pose safety hazards during installation.

In lieu of physically wiring the RTU to the various field devices wireless field devices with wireless connections to the RTU may be used. However, conventional approaches for wirelessly connecting field devices to the RTU are not without their own problems. First, since the connection between the RTU and the field device is no longer physically wired, the power normally supplied by the RTU over the physical wiring now needs to be separately supplied at each of the wireless field devices. In other words, each wireless field device now needs a separate power source. Second, because of certain industry requirements, data from the wireless field devices may be required to be reported periodically, and this may create additional power requirements for the wireless field devices. For example, the American Petroleum Institute (API) 21.1 standard requires that field data be taken once-per-second to calculate gas flow rates and, as a result, the wireless radio in the wireless field device would need to be turned on once-per-second to convey this information back to the RTU. Since the wireless radio is one of the most power hungry portions of the wireless field device, and given the number of times the radio needs to be powered on to comply with the API standard, wireless versions of field devices may end up consuming a large amount of power. This increase in power consumption may result in a consequent increase in the cost and/or complexity of each of the separate power sources. Third, notwithstanding industry standards setting forth how frequently certain well measurements are to be taken, recent industry developments have noted that making well measurements more frequently than the industry standards may help to better optimize production of the well, particularly in later stages of the well's production period. Thus, the power consumption concerns associated with how frequently well data is measured using wireless field devices may be exacerbated during the later stages of the well's production period where more detailed data is taken to optimize the well. Fourth, because of the unreliability of wireless communications, the industry is generally reluctant to use wireless field devices for critical monitoring functions (such as collecting data for gas production calculations) or for critical control functions (such as activating pumps or valves to control production from the well). Accordingly, methods and apparatuses that overcome one or more of the aforementioned problems, as well as others, are desirable.

SUMMARY

Some embodiments include a system for communication in an oil and gas well, the system including a controller, a first universal wireless adapter (UWA) wirelessly coupled to the controller, where the UWA is coupled to a first field device, a second UWA wirelessly coupled to the controller, where the UWA is coupled to a second field device, where the controller passes a control token among the first and second UWAs based upon communication traffic between the first and second UWA and the first and second field devices respectively. In some embodiments, this control token may be passed between the first and second UWAs depending upon communications between the respective UWAs and their field devices. For example, in the event that communication traffic is greater between the first UWA and the first field device, then the control token is passed to the first UWA.

Other embodiments include a method for operating an oil and gas well, the method comprising determining a first level of local communication between a first UWA and a first field device, determining a second level of local communication between a second UWA and a second field device, comparing the first and second levels of communication, and passing a control token between the first and second UWAs based upon the act of comparing, where the control token includes the ability to control operations of the entire well.

Still other embodiments include a computer readable storage medium, comprising executable code, the executable code comprising the steps of determining a first level of local communication between a first UWA and a first field device, determining a second level of local communication between a second UWA and a second field device, comparing the first and second levels of communication, and passing a control token between the first and second UWAs based upon the step of comparing, where the control token includes the ability to control operations of the entire well.

BRIEF DESCRIPTION OF THE DRAWINGS

The use of the same reference numerals in different drawings indicates similar or identical items.

DETAILED DESCRIPTION OF THE INVENTION

Although one or more of the embodiments disclosed herein may be described in detail with reference to a particular device, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to suggest that the scope of the disclosure, including the claims, is limited to these embodiments.

Figure 1:
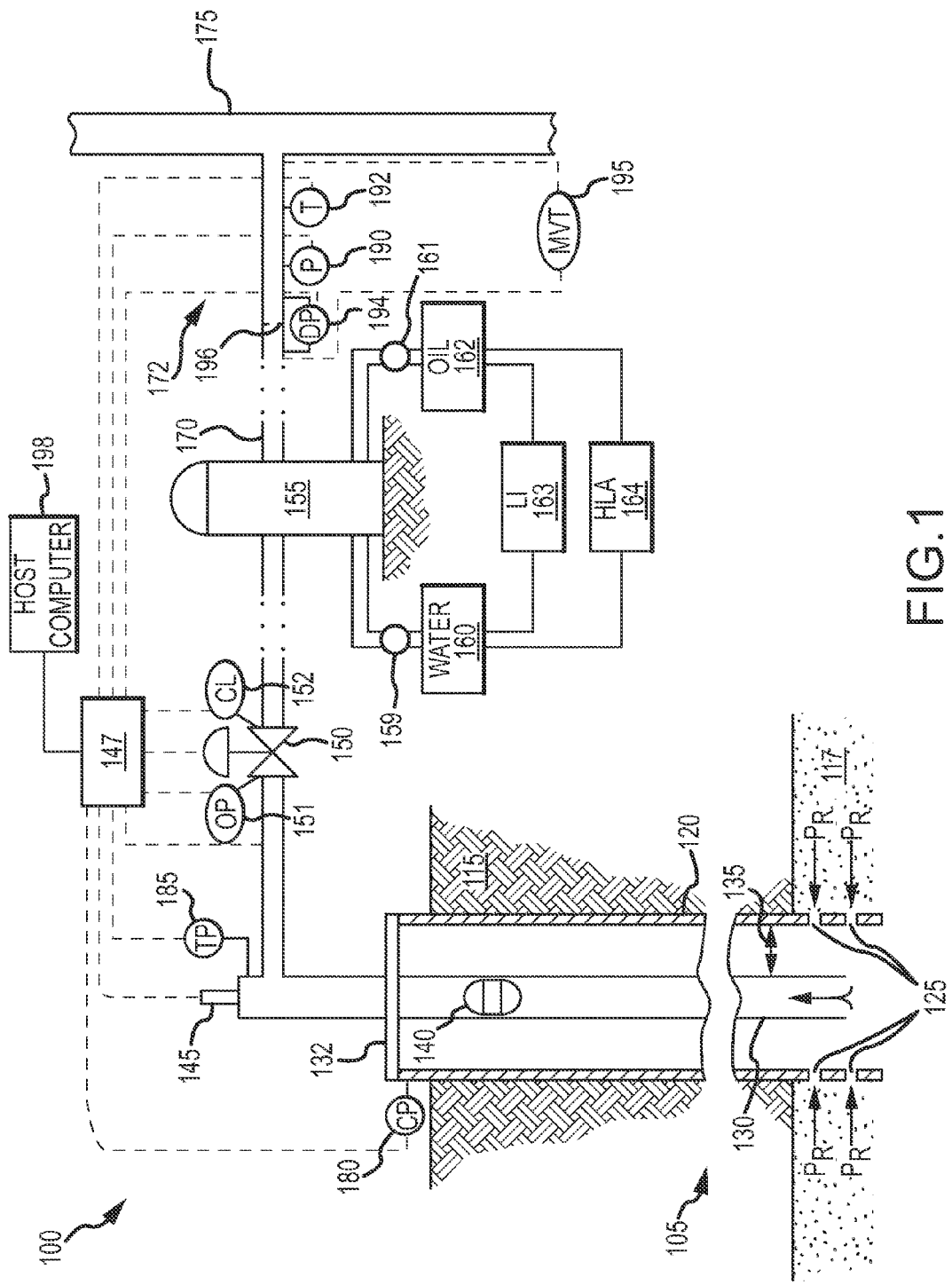
FIG. 1 illustrates a well capable of implementing universal wireless adapters.

FIG. 1 illustrates a petroleum well 100 capable of implementing intelligent universal wireless adapters. It should be appreciated that while the well 100 is discussed herein in the context of a petroleum well that produces hydrocarbons, the methods and apparatuses for optimizing the well 100 may equally apply to non-well situations, such as communication among field devices in the utility industries or even in factory settings outside the utility industry.

Referring now to FIG. 1, the well 100 generally includes a wellbore 105 that is vertically drilled into a formation 115. Although the wellbore 105 is shown and described as being vertical in nature for convenience of discussion, it should be appreciated that the wellbore 105 may be non-vertical, for example, as a result of directional drilling techniques.

The formation 115 may include several strata that include petroleum-containing reservoirs of interest. For example, as shown in FIG. 1, the formation 115 may include a reservoir 117 that contains mixtures of oil and gas. After the wellbore 105 is drilled into the formation 115, a casing 120 is placed into the wellbore 105, where the casing 120 may include a group of perforations 125 situated about the wellbore 105 in the location of the reservoir 117. While FIG. 1 illustrates one group of perforations 125 for the sake of discussion, the casing 120 may include several groups of perforations 125 at various locations along the wellbore 105 so as to coincide with reservoirs of interest.

The well 100 may include production tubing 130 that conveys oil and gas to the surface for further processing. As shown, the tubing 130 is enclosed within the casing 120 beneath a wellhead 132 and exposed above the wellhead 132. The tubing 130 is generally smaller in diameter than the casing 120, and as a result, an annular void or cavity 135, referred to herein as the annulus 135, may be formed between the casing 120 and the tubing 130. Although not specifically shown in FIG. 1, a production packer may be placed in the annulus 135 near the end of the tubing 130 so as to provide a seal between the outside diameter of the tubing 130 and the inside diameter of the casing 120. In the embodiments that include a production packer, a hole may be drilled in the tubing 130 above the packer so that the annulus 135 may accumulate pressure to indicate the bottom hole pressure condition when the well is opened or closed to production.

The tubing 130 may include a plunger 140 that is vertically moveable within the tubing 130. When the tubing 130 fills with fluid from the reservoir 117, the plunger 140 may assist in clearing this fluid from the tubing 130. A plunger arrival switch 145 may be coupled to the end of the exposed portion of the tubing 130 to determine when the plunger 140 has reached the top of the tubing 130. In some embodiments, the plunger arrival switch 145 may operate by emanating a magnetic field and sensing changes in this magnetic field as the plunger 140 passes through the magnetic field to indicate it has arrived at the top of the tubing 130. As will be described in greater detail below, various field devices, such as the plunger arrival switch 145 may couple to a controller 147 in a wireless fashion.

As shown in FIG. 1, the tubing 130 may couple to various surface equipment components in order to facilitate delivery of the oil, water and gas that are produced from the wellbore 105. Specifically, a control valve 150 that regulates production from the wellbore 105 may be coupled to the tubing 130. The control valve 150 may couple to the controller 147, which regulates the production from the wellbore 105 in response to measurements from various field devices. In some embodiments, communication between the control valve 150 and the controller 147 may be two-way, where the valve 150 conveys its position (e.g., fully opened, fully closed, somewhere between) via one or more position switches 151 and 152 that are coupled to the control valve 150. The position switch 151 may indicate an open position to the controller 147 while the position switch 152 may indicate a closed position to the controller 147, and the controller 147 may use this as feedback in conveying a desired position to the control valve 150. Thus, under direction from the controller 147, the control valve 150 may have the ability to open, modulate production from, or shut-in the well 100. The actual implementation of the control valve 150 may vary between different embodiments. For example, in some embodiments, the control valve 150 may be a gas actuated control valve of the type disclosed in commonly owned U.S. patent application Ser. No. 12/552, 630.

Production from the well 100 may be in the form of a liquid-gas emulsion that includes a mixture of oil, gas, and water. The control valve 150 may flow this emulsion to an inlet of a separator 155 where the emulsion is separated into its constituent portions. A water holding tank 160 and an oil holding tank 162 may couple to outlets of the separator 155 to collect the liquid portions of the emulsion (e.g., water and oil). One or more turbine meters 159 and 161 may be coupled in line between the holding tanks 160 and 162 and the separator 155 to measure the flow rate of the water and oil respectively. The gas portion of the emulsion may exit the separator 155 through an outlet coupled through a final section of piping 170 and the gas production may be measured at the portion of the well 100 where the custody of the gas is transferred to a gas pipeline 175 for further refinement or sales. The portion of the well 100 where the gas production is measured is generally referred to as the "meter run" and is indicated in FIG. 1 with reference numeral 172. It should be appreciated that the distances between the various surface equipment components including the wellhead 132, control valve 150, the separator 155 and the meter run 172 are not shown to scale in FIG. 1, and the actual distances may vary between embodiments. For example, in some embodiments, the distance between the various surface equipment components may be around 75 feet, while in other embodiments, the distance between the various surface equipment components may be thousands of feet.

As shown in FIG. 1, the well 100 also may include a plurality of field devices capable of measuring various well characteristics. On the wellhead 132 side, a casing pressure (CP) gauge 180 may couple to the casing 120 to monitor the pressure in the casing 120 and a tubing pressure (TP) gauge 185 may couple to the tubing 130 to monitor the pressure in the tubing 130. At the oil holding tank 162, a liquid level indicator (LLI) 163 may couple to the oil holding tank 162 to determine the level of liquid in the holding tank 162. Also, a high level alarm (HLA) 164 may couple to the oil holding tank 162 to indicate if the level of oil in the tank is higher than a predetermined threshold. For example, in some embodiments, this predetermined level may be a level above which would create a potential environmental hazard. At the meter run 172, a pressure gauge 190 may couple to the piping 170 to measure the pressure of the gas transmitted into the pipeline 175, which is sometimes termed "line pressure" (LP). A temperature gauge 192 may couple to the piping 170 to measure the temperature of the gas transmitted into the pipeline 175, which is sometimes termed "line temperature" (LT), and a pressure gauge 194 may measure the pressure in the piping 170 on either side of an orifice plate 196, sometimes termed "differential pressure" (DP). In some embodiments, the gauges 190, 192, and 194 may be combined into a single three-in-one gauge set 195 at the meter run 172. This single three-in-one gauge set 195 is sometimes referred to as a "multi-variable transmitter" (MVT). Regardless of the implementation, readings from the gauges 190, 192, and 194 or the three-in-one gauge 195 may be used to calculate volumetric flow in the piping 170. In some embodiments, these calculations are performed in the controller 147, which is sometimes referred to as an "electronic flow measurement computer" (EFM).

The field devices 145, 150, 151, 152, 163, 164, 180, 185, 190, 192, 194, and 195 may couple to the controller 147 to convey their measured values and/or receive control signals. The actual implementation of the controller 147 may vary between embodiments. For example, in some embodiments, the controller 147 may be a RTU, such as the FIELD-HOUND™ VM-32 model available from CH2M Hill, and in other embodiments, the controller 147 may include a programmable logic controller (PLC) or general purpose computer configured to monitor and/or control field devices 145, 150, 151, 152, 163, 164, 180, 185, 190, 192, 194, and 195. In some embodiments, the controller 147 may further couple wirelessly to a host computer 198 as shown, where the host computer 198 may store and/or process measurement data from the various field devices 145, 151, 152, 163, 164, 180, 185, 190, 192, 194, and 195; and may store and/or process algorithms for activating the field control end device 150. As will be described in detail with regard to FIG. 3, the host computer 198 may be located in an area that is remote to the controller 147.

During operation of the well 100, the controller 147 may monitor and/or control the various field devices 145, 150, 151, 152, 163, 164, 180, 185, 190, 192, 194, and 195. Specifically, at the well head 132 the controller 147 may monitor pressure readings from the tubing and casing pressure gauges 180 and 185, as well as monitor the plunger arrival switch 145 to determine the status of conditions down hole. In addition, at the meter run 172, the controller 147 may monitor the gauges 190, 192, and 194 to determine the differential pressure, temperature and pressure and calculate a volumetric flow rate of gas entering the pipeline 175 from the piping 170. Depending upon conditions at the wellhead 132 and/or conditions at the meter run 172 and the status of the control valve 150, the controller 147 may open up, modulate production from, or shut-in the well 100 by actuating the control valve 150 accordingly. In this manner, the controller 147 may be used to optimize gas production from the well 100 based upon the monitored values from the various field devices 45, 180, 185, 190, 192, 194, and 195.

As mentioned above, the distance between the controller 147 and the various surface equipment components may vary between about 75 feet and thousands of feet. Thus, even at the shorter distances, the distance between the controller 147 and the various surface equipment components may be too great to physically wire the various field devices 145, 150, 151, 152, 163, 164, 180, 185, 190, 192, 194, and 195 in a cost effective manner. Additionally, there may be other reasons that may make it difficult to physically connect the controller 147 to the various field devices 145, 150, 151, 152, 163, 164, 180, 185, 190, 192, 194, and 195. For example, the proposed installation location for the various field devices 145, 150, 151, 152, 163, 164, 180, 185, 190, 192, 194, and 195, may be of a certain hazardous classification (CLASS I, DIV I), which may necessitate installing the controller 147 in an alternate location that is much farther away from the proposed installation location for the various field devices, or alternatively, it may necessitate installing the controller 147 in a specialized enclosure suitable for hazardous environments. Either installing the controller 147 in an alternate location, which would require careful hand trenching for wiring, or installing the controller 147 in a specialized enclosure can be quite expensive. Accordingly, in some embodiments, at least a portion of the connection between the controller 147 and the various field devices 145, 150, 151, 152, 163, 164, 180, 185, 190, 192, 194, and 195 may be implemented wirelessly using one or more intelligent universal wireless adapters that connect physically to the various field devices.

Figure 2:
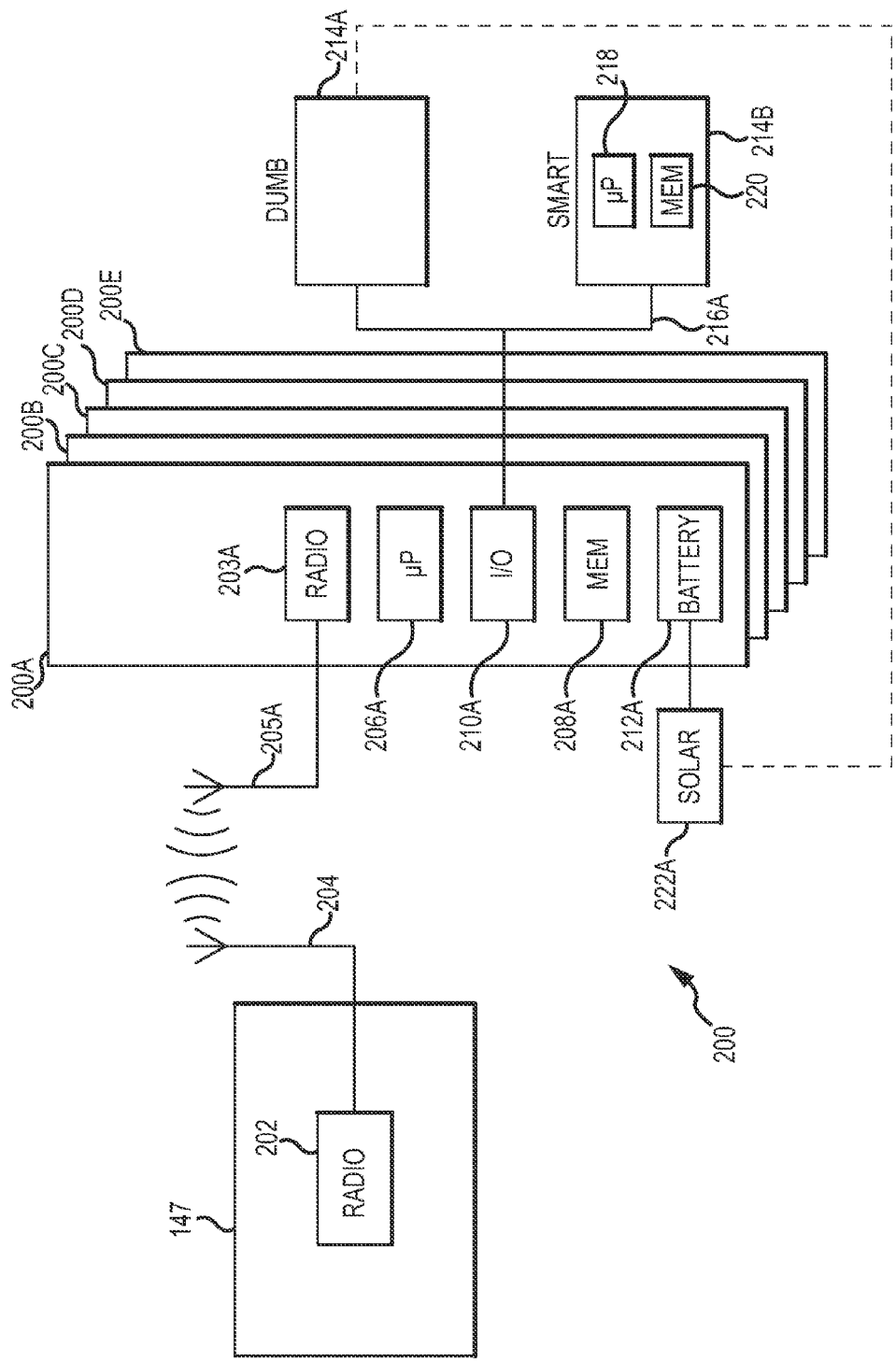
FIG. 2 illustrates a block diagram of a wireless coupling arrangement between a controller and one or more intelligent universal wireless adaptors (IUWAs).

FIG. 2 illustrates a block diagram of a wireless coupling arrangement between the controller 147 and one or more intelligent universal wireless adaptors IUWAs 200A-D. The letter designation after the IUWA reference numeral indicates that each of the IUWAs 200A-D may be located in different areas within the well 100. For example, referring momentarily back to FIG. 1 in conjunction with the block diagram of FIG. 2, the areas within the well 100 may be defined as follows: area A at the wellhead 132, area B at the control valve 150, area C at the meter run 172, and area D at the oil holding tank 162 and/or water holding tank 160. Thus, the IUWA 200A may correspond to an IUWA at the wellhead 132, the IUWA 200B may correspond to an IUWA at the control valve 150, the IUWA 200C may correspond to an IUWA at the meter run 172, and the IUWA 200D may correspond to an IUWA at one or both of the holding tanks 162 and 160.

Figure 3:
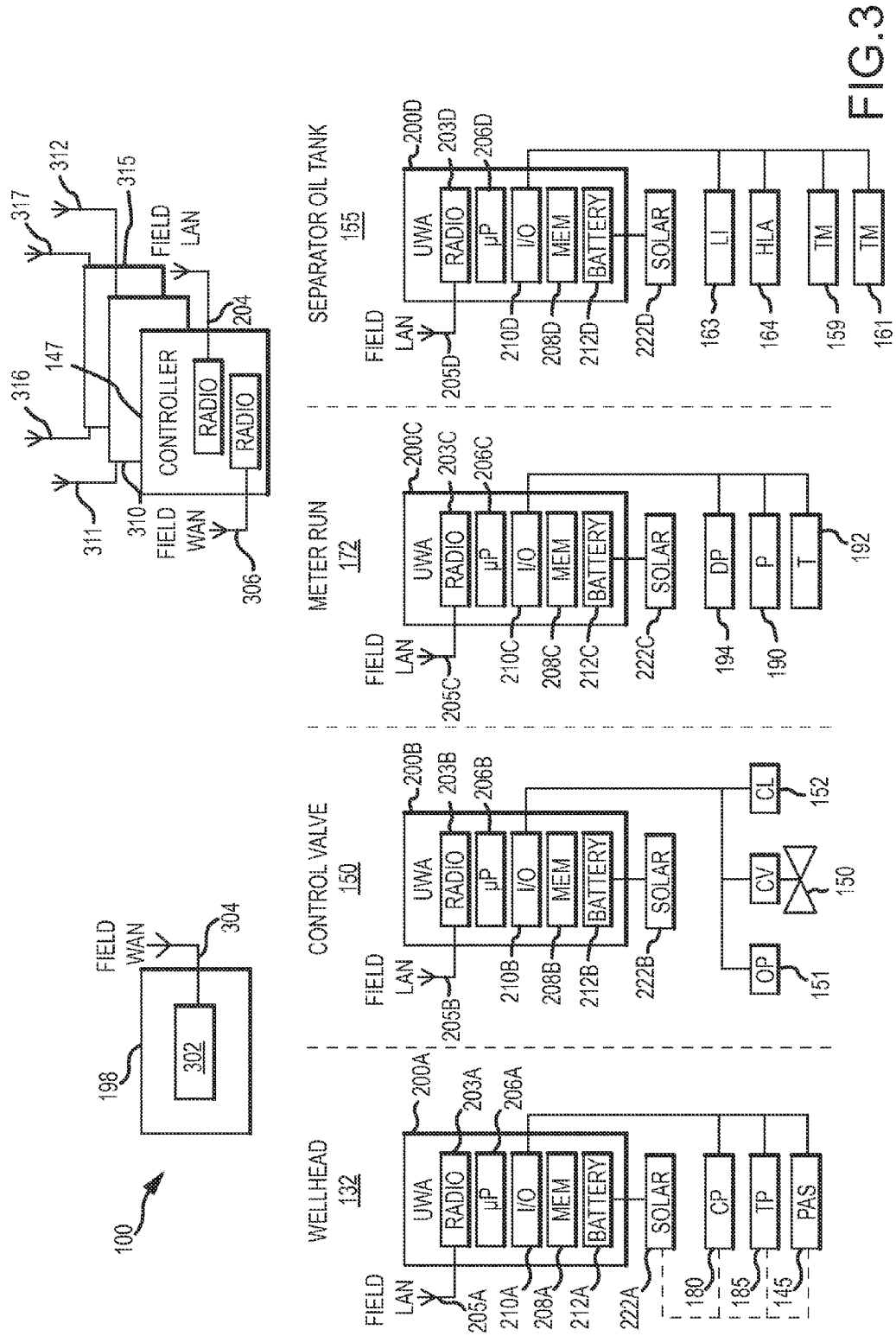
FIG. 3 illustrates an embodiment where each of the IUWAs are assigned to one of the areas of the well shown in FIG. 1.

As shown in FIG. 2, the controller 147 may couple to the IUWA 200A via a wireless local area network (LAN) using the combination of internal radios 202 and 203A and antennas 204 and 205A. In addition to the internal radio 203A, the IUWA 200A also may include a microprocessor 206A, a memory 208A, input-output (I/O) circuitry 210A, and a battery 212A all coupled to each other. The I/O circuitry 210A couples to one or more field devices 214A-B via a physical (rather than wireless) connection 216A. (Other IUWAs 200B-D and their physical connections 216B-D to other field devices are not specifically shown in FIG. 2 for the sake of clarity, but are shown in FIG. 3 below.)

In some embodiments, the particular field devices 214A-B may be discrete instrument devices capable of monitoring the process parameters, such as the TP gauge 185 and/or the HLA 164. Thus, in these embodiments, the field devices 214A-B would be capable of sending electrical signals via the physical connection 216A back to the IUWA 200A in proportion to the tubing pressure and the oil tank high level alarm condition, respectively. In other embodiments, the field devices 214A-B may be discrete instrument devices capable of performing process control within the well 100, such as the control valve 150. Thus, in these embodiments, the field devices 214A-B may be capable of receiving electrical signals that relate to the desired positioning of the control valve 150 via the physical connection 216A from the IUWA 200A.

The complexity of the field devices 214A-B may vary between different embodiments. For example, FIG. 2 illustrates the field device 214B as a "smart" instrument device (such as the MVT gauge 195), that includes a local microprocessor 218 and memory 220 and is capable of periodically monitoring the process parameters of pipeline pressure, pipeline temperature, and differential pressure and then making calculations based upon these measurements. In these embodiments, the physical connection 216A may be capable of complying with the MODBUS®, HART®, and/or TCP/IP protocols. Generally, the frequency of the data measurements taken by the field device 214B will vary, but in some embodiments, measurements may be taken at least once-per-second so as to comply with the API 21.1 standard. Furthermore, in some embodiments, regardless of the frequency of which the measurements are taken, the measurements may be transmitted to the controller 147 in batch form less frequently than this frequency, such as less than once-per-second in the embodiments that comply with the API 21.1 standard.

Other "smart" field devices 214B include devices capable of communicating over the physical connection 216A include a submersible pump controller in the wellbore 105 at the bottom of the tubing 130 (not specifically shown in the figures), where control programs and on/off set points to control the operation of the submersible pump controller are conveyed over the physical connection 216A and then stored in the memory 220 and/or processed by the microprocessor 218.

Regardless of the actual implementation of the "smart" field device 214B, program code executed by the microprocessor 218 may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and/or solid state memory, which may be internal to one or more integrated circuits within the IUWA 200A, such as the memory 220.

In other embodiments, the field devices may be more rudimentary. For example, FIG. 2 also illustrates the field device 214A as an instrument device (such as gauge 185), which is capable of monitoring pressure and producing an output directly to the IUWA 200A device as an electrical signal without the capability or need to process the data or store the data in memory. For example, the field device 185 may produce analog voltage values representative of the pressure (TP) measured at the top of the tubing 185 (shown in FIG. 1), where the analog voltage value is scaled between one and five volts as the pressure at the top of the tubing 185 changes. This analog voltage value may be conveyed from the field device 214A to the IUWA 200A via the physical connection 216A. In other embodiments where the field device 214A is rudimentary, it may be implemented as a discrete control device such as an electric motor control valve actuator that is capable of receiving an instruction from the controller 147 (via the IUWA 200A) commanding the electric motor control valve to open or close the control valve 150.

Referring still to FIG. 2, a power supply device, such as a solar panel 222A, also may be coupled to the IUWA 200A and/or field devices 214A-B to provide power that conventionally would be provided by the controller 147 in a wired configuration. In some embodiments, power provided by the solar panel device 222A may charge the battery 212A directly, and in other embodiments, the power may be supplied to the microprocessor 218 and the memory 220 directly. As a result of the lowered power requirements, the solar panel 222A may be less costly and complicated. For example, it is believed that the power savings achieved by locally buffering the once-per-second data can be as much as 90 percent (e.g., reducing the solar panel from a 60 watt panel to a 5 watt panel).

As mentioned previously, the IUWA 200A and the controller 147 may communicate using the radios 202 and 203A. In some embodiments, these radios 202 and 203A may be spread spectrum radios that operate at frequencies of about 900 MHz. These embodiments are in distinction to conventional radios operating at higher frequencies, e.g., 2.4 GHz, where the higher frequency taken by conventional approaches is intended to increase the overall data rate of the transmission. Because these higher frequencies also translate into a lower range of transmission, oil and gas wells implementing these higher frequencies often require costly repeaters or they require an increase in power to the radios to boost the radio signal.

FIG. 3 illustrates the embodiment described above where each of the IUWAs 200A-D of FIG. 2 are assigned to one of the areas of the well 100 shown in FIG. 1. Specifically, referring to FIG. 3 in conjunction with FIG. 1, the IUWA 200A may be assigned to communicate with the field devices 145, 180, and 185 at the wellhead 132, the IUWA 200B may be assigned to communicate with the field devices 150, 151, and 152 at the control valve 150, the IUWA 200C may be assigned to communicate with the field devices 190, 192, and 194 at the meter run 172, and the IUWA 200D may be assigned to the field devices 163 and 164 at one or both of the oil tanks 106 and 162.

Conventional approaches that employ wireless field devices often limit the transmission of measurements from the field devices back to the controller 147 to once every eight minutes (or even less frequently) so as to conserve power consumed by having the radios on so frequently. As a result, what is actually transmitted in conventional approaches is an instantaneous measurement from the field device at the time of transmission, or an hourly average of measurements from the field device—neither of which are once-per-second measurements as required by the API 21.1 standard. Conventional systems could be used to transmit data once every second but the power requirements would be much higher because the radios would need to be powered on and off once-per-second.

Referring to FIG. 3, another distinction between conventional approaches is in the local storage of data signals in the IUWAs 200A-D. Signals measured by the field devices (such as pressure, differential pressure, and temperature measurements to name but a few) may be conveyed to the IUWAs 200A-D via a wired connection 216A-D and then stored locally in the particular IUWA 200A-D before wirelessly conveying these measurements back to the controller 147. Thus, once-per-second measurements from the various field devices may be locally retained by the particular IUWA 200A-D and then transmitted back to the controller 147 in batch form. Since the radios 203A-D and 202 generally consume the largest portion of the overall power consumed by the IUWAs 200A-D and the controller 147, locally retaining signals from the field devices in their respective IUWAs 200A-D and then transmitting them less frequently than conventional systems may reduce the overall power consumption of the IUWAs 200A-D and the controller 147 while still complying with the API 21.1 requirements.

Furthermore, local retention of the field device measurements has other advantages. Having fewer wireless communications between the controller 147 and the various IUWAs 200A-D results in additional bandwidth available to the controller 147, and therefore, additional IUWAs may be monitored and/or controlled by the controller 147. This concept, in conjunction with virtualizing the controller 147 in software, as described in commonly owned U.S. Pat. No. 7,446,673, which is incorporated by reference, may result in a significant increase in the overall number of field devices supported by a single controller 147.

Another advantage of locally retaining the data within the particular IUWAs 200A-D is increasing the fidelity of wireless communications between well components. Many conventional approaches that implement wireless communication in wells do not implement wireless communication in areas of the well that are considered "critical" monitoring and/or control functions because the actual wireless signals between the conventional controllers and wireless field devices often fails. For example, the meter run 172 of the well 100 is considered a "critical" monitoring function because the measurements made in this area of the well 100 (differential pressure, pressure, and temperature) are used to calculate the value of the gas sold to the utility company. In order to be compliant with the 21.1 API requirements, conventional approaches would have to wirelessly transmit measurements from the field devices 190, 192, and 194 back to the controller 147 once-per-second. Because the field devices 190, 192, and 194 and the controller 147 may be separated by considerable distances and because other obstructions (trees, elevation changes, etc.), may be located between the field devices 190, 192, and 194 and the controller 147, the wireless signals may not reach the controller 147. As a result, the conventional approach is usually to simply pay the additional cost involved in physically connecting the controller 147 to field devices with "critical" monitoring and/or control functions. However, by locally retaining the measurements within each IUWA 200A-D assigned to an area with "critical" field devices, if wireless communications to the controller 147 are lost, then the measurements may be retrieved from the memories 208A-D within that particular IUWA 200A-D.

Referring still to FIG. 3, the connection between the computer 198 and the controller 147 is illustrated in greater detail than what was shown in FIG. 1. Specifically, the host computer may include a wireless radio 302 that wirelessly couples to the controller 147 through antennas 304 and 306 as well as wirelessly couples to other controllers akin to the controller 147, such as a controller 310 (which may have antennas 311 and 312 configured to communicate signals similar to antennas 304 and 306) and/or a controller 315 (which may have antennas 316 and 317 configured to communicate signals similar to antennas 304 and 306). In these embodiments, the controllers 310 and/or 315 may be implemented at different wells than well 100.

With continuing reference to the embodiment shown in FIG. 3, the various IUWAs 200A-D may be programmed to communicate with and/or receive commands from each other rather than the controller 147. For example, in some embodiments, the IUWA 200A is used to open, close and/or modulate the position of control valve 150 to control production from the wellhead 132. The criteria to open the valve is generally based upon optimum combinations of process measurements monitored from field devices at the wellhead 132, such as measurements from the casing pressure gauge 180 and the tubing pressure gauge 185 as well as measurements from field devices at the meter run 172 including the pipeline pressure gauge 190. Rather than having the controller 147 wirelessly communicate with the IUWA 200A and 200C to obtain these measurements, and then have the controller 147 wirelessly communicate with the IUWA 200B to open the control valve 150 in response to the optimum combinations of these measurements, control may be distributed to the IUWA 200A at the wellhead 132 to communicate autonomously with the IUWAs 200B and 200C. Specifically, the IUWA 200A may be programmed to evaluate the readings of the casing pressure gauge 180 and the tubing pressure gauge 185 directly. When these conditions represent an optimum time to open up the control valve 150, such as when these pressures are sufficient to overcome the lowest historical line pressure measurement from the gauge 190, the IUWA 200A may autonomously open the control valve 150 by communicating directly with the IUWA 200B rather than asking the controller 147 to do so. The IUWA 200A may determine this optimum opening criteria by directly polling the IUWA 200C to monitor the line pressure 190, and when this line pressure reaches the appropriate value, the IUWA 200A may communicate directly to the IUWA 200B device to open the control valve 150. This method of direct communication between the IUWAs 200A-C may reduce the overall amount of wireless transmissions between the controller 147 and the IUWA 200A-C. This is but one example of autonomous control by the IUWA 200A. In fact, numerous other embodiments of autonomous control with the IUWAs 200A-D are possible where the other IUWAs 200B-D autonomously control the well 100 in order to effectuate monitoring and/or control functions of the well 100 while minimizing wireless communications between the IUWAs 200A-D and the controller 147.

Figure 4:
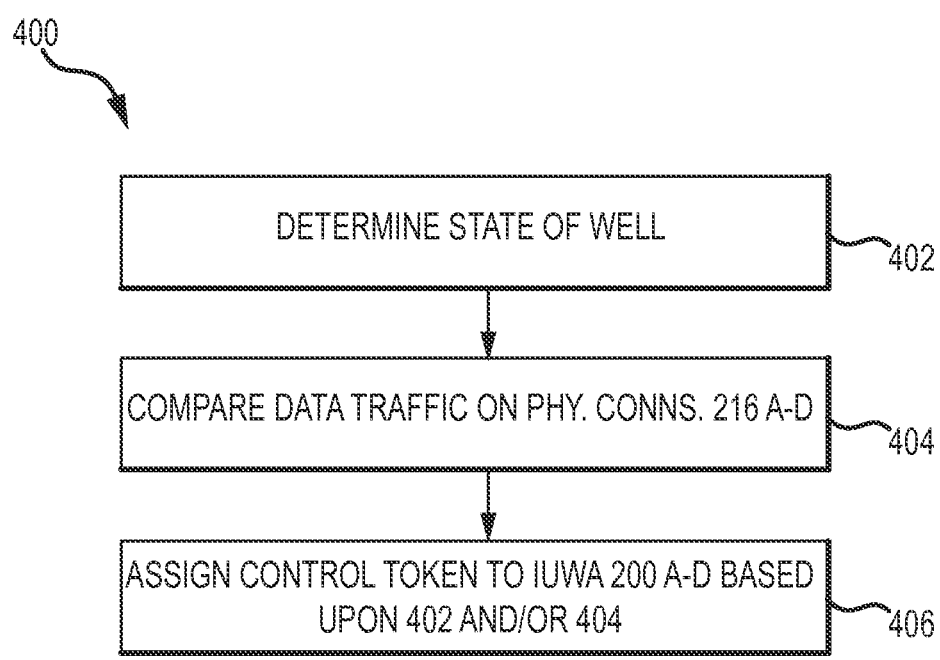
FIG. 4 illustrates a method that may be implemented to pass autonomous control of the well between the IUWAs.

FIG. 4 illustrates a method 400 that may be implemented by the controller 147 in conjunction with the IUWAs 200A-D to pass autonomous control of the well between the IUWAs 200A-D in an effort to minimize wireless data communication and/or power consumption. With reference to FIG. 4 in conjunction with FIG. 3, in block 402, the state of the well 100 may be determined. This determination may be made either by the controller 147, the computer 198, and/or any of the IUWAs 200A-D. In some embodiments, this determination may be made by taking measurements at each of the field devices 145, 150, 151, 152, 163, 164, 180, 185, 190, 192, 194, and 195. Again these measurements may be stored in the memories 208A-D of the assigned IUWAs 200A-D, and the controller 147 may then wirelessly poll these memories 208A-D to determine the state of the well 100 at any given time. Alternatively, each of the IUWAs 200A-D may autonomously report these states to the controller 147 at any given time. The determined states may include: alarm, closed, closed ready to open, open, open ready to close, flowing, flowing ready to increase production, and flowing ready to decrease production to name but a few.

In addition to determining the actual state of the well 100, the relative levels of data traffic on each of the physical connections 216A-D may be compared to each other per block 404. Again, this comparison may be performed by the controller 147, the computer 198, and/or any of the IUWAs 200A-D operating autonomously. The relative levels of data traffic over time for each physical connection 216A-D may represent a need for a particular IUWA 200A-D to operate autonomous of the controller 147 to minimize wireless data traffic. For example, if the sampling per block 404 shows that data traffic on the physical connection 216B is greater than on the other physical connections 216A, C, and D, then allowing the IUWA 200B to take control of the well 100 would be more effective than allowing the controller 147 to control of the well 100 because the communications that represent local measurements on the physical connection 216B could be used locally by the IUWA 200B without having to wirelessly transmit them back to the controller 147. Thus, in block 406, a control token, may be passed between the various IUWAs 200A-D to minimize data traffic per the comparison of block 404.

The control token also may be passed between the various IUWAs 200A-D based upon the state of the well 100 as determined in block 402. For example, if the well 100 is in an alarm state, meaning that it should be closed immediately for safety purposes, then the IUWA 200B may receive the control token so that it can autonomously control the control valve 150 without permission from the controller 147.

Figure 5:
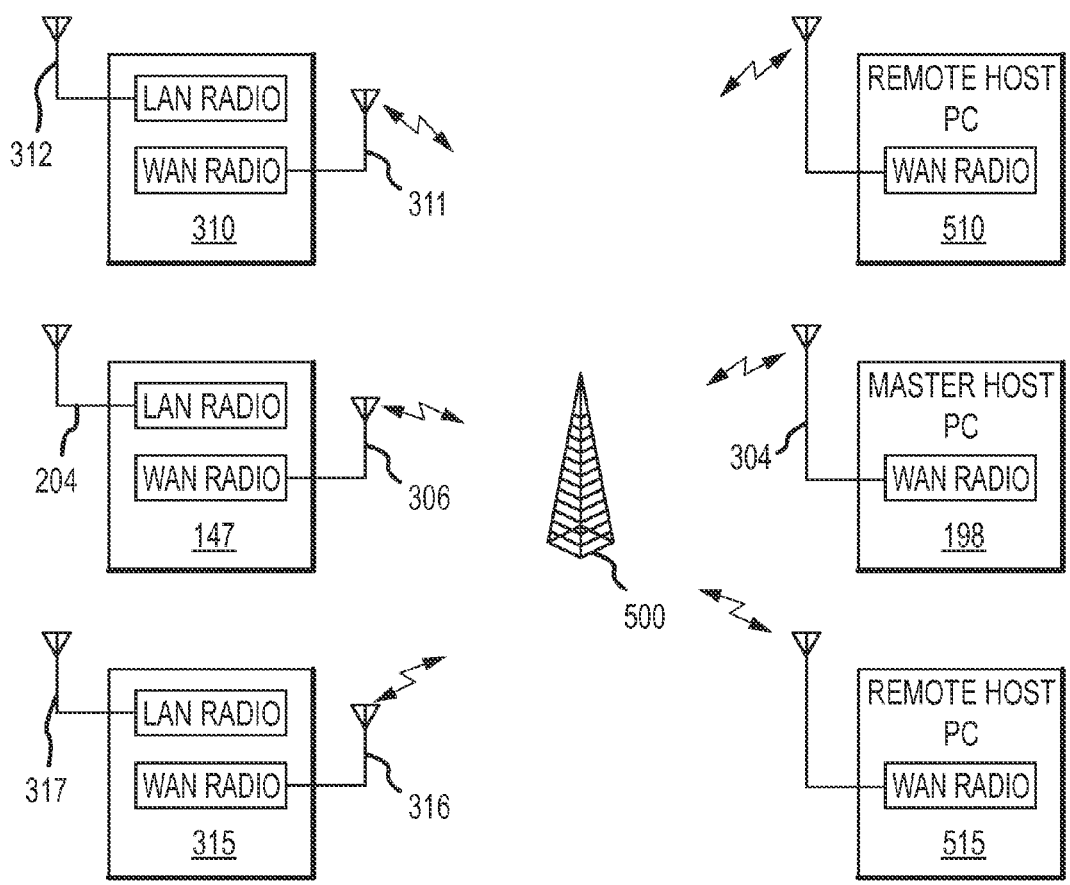
FIG. 5 illustrates one possible hierarchical relationship among multiple controllers.
Figure 6:
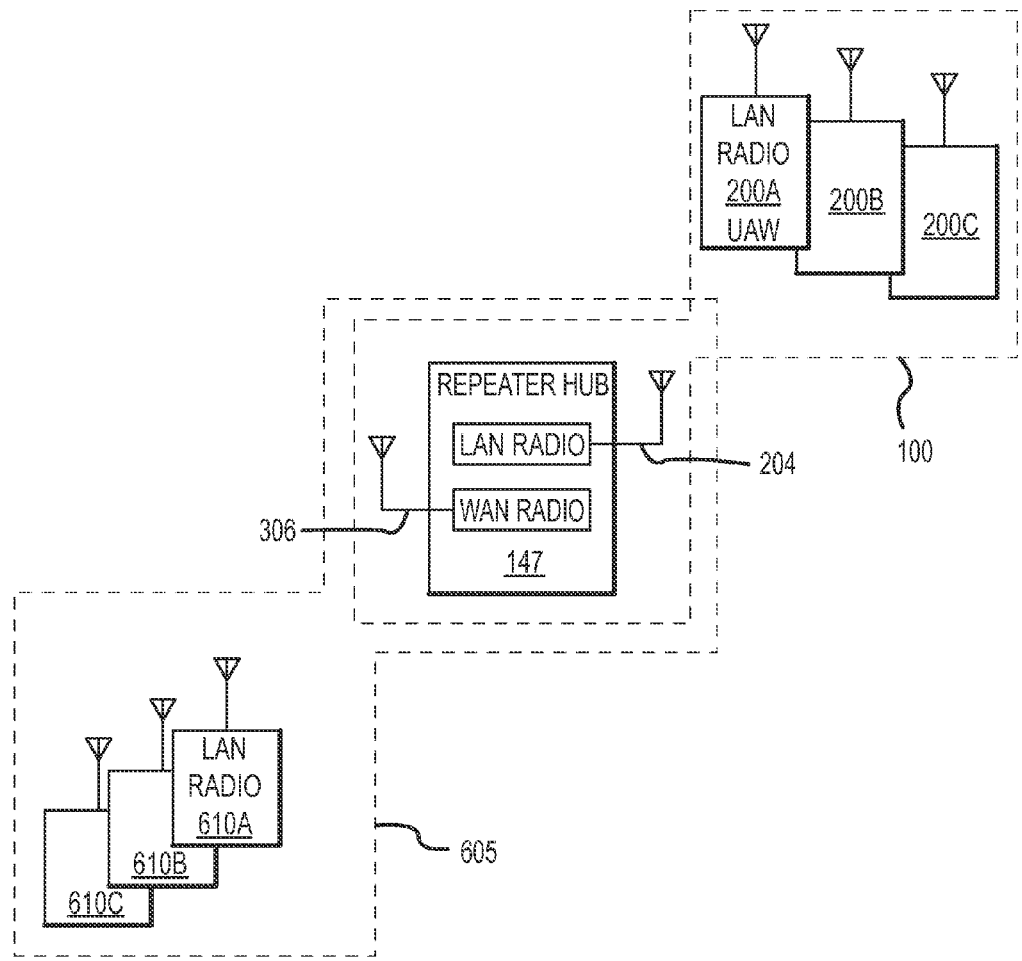
FIG. 6 illustrates implementing a controller in multiple wells concurrently.

Although one or more of the embodiments disclosed herein may be described in detail with reference to a particular well configuration, the embodiments should not be interpreted or otherwise used as limiting the scope of the disclosure, including the claims. In addition, one skilled in the art will understand that the following description has broad application. Thus, while embodiments disclosed herein may focus on certain well configurations, such as those illustrated in FIGS. 1-4, it should be appreciated that the concepts disclosed herein equally apply to other well configurations. For example, referring briefly to FIG. 5, the controllers 147, 310, and 315 may be arranged in a hierarchical relationship where each of the controllers 147, 310, and 315 has an equal amount of authority over a different well, and thus, each of their respective wells may communicate to the host computer 198 through a wireless WAN repeater tower 500. In these embodiments, the host computer 198 may be acting as a master computer that aggregates data on behalf of each of the controllers 147, 310, and 315. Similarly, any of the controllers 147, 310, and 315 may communicate with different host computers 510 and/or 515 through the repeater tower 500. In other embodiments, the controller 147 may be concurrently part of other wells, such as a well 600 in addition to the well 100 as shown in FIG. 6. Referring briefly to FIG. 6, the well 600 may include multiple UWAs 610A-C capable of differing capabilities than the UWAs of the well 100. For example, the well 600 may include compressor monitoring, EFM monitoring, and controlling the injection of chemicals into the formation 117. Accordingly, the discussion of any embodiment is meant only to be exemplary and is not intended to suggest that the scope of the disclosure, including the claims, is limited to these embodiments.

What is claimed is:

1. A system for communication in an oil and gas well, the system comprising:
   a controller;
   a first universal wireless adapter (UWA) wirelessly coupled to the controller, wherein the UWA is coupled to a first field device; and
   a second UWA wirelessly coupled to the controller, wherein the UWA is coupled to a second field device;
   wherein the controller is configured to determine which of the first or second UWAs is to receive a control token based on an operating state of the well, a comparison of communication traffic between the first and second UWA and the first and second field devices respectively, or both, and is configured to pass the control token to one of the first or second UWAs based on said determination;
   further wherein the first or second UWA is allowed to perform monitoring and control functions of the well when in possession of the control token from the controller.

2. The system of claim 1, wherein in the event that communication traffic is greater between the first UWA and the first field device, then the controller passes the control token to the first UWA.

3. The system of claim 2, wherein the first UWA passes the control token to another UWA within the system based upon an alarm condition.

4. The system of claim 1, wherein the first and second field devices couple to the first and second UWAs via a hardwired connection.

5. The system of claim 1, wherein the first UWA comprises a first memory and process data is stored in the first memory and transmitted to the controller from the first memory in batch form.

6. The system of claim 5, wherein the process data comprises data recorded in the memory at least once-per-second.

7. The system of claim 5, wherein the first field device comprises a pressure and temperature sensor.

8. The system of claim 7, the second field device comprises a control valve and the first UWA communicates measurements from the first field device directly to the second UWA without the controller.

9. The system of claim 5, wherein the process data is transmitted to the controller after the controller experiences a power outage.

10. The system of claim 1, wherein the second UWA is capable of operating as a redundant backup for the first UWA.

11. A method for operating an oil and gas well, the method comprising the acts of:
   determining which of a first UWA and a second UWA is to receive a control token based on an operating state of the well, a comparison of a first level of local communication between the first UWA and a first field device;
   and a second level of local communication between the second UWA and a second field device, or both;
   and
   passing the control token to one of the first or second UWAs based upon the act of determining, wherein the control token includes the ability to control operations of the well.

12. The method of claim 11, wherein the comparison reveals that the first level of communications is greater than the second level of communications and the act of passing includes passing the control token to the first UWA.

13. The method of claim 12, wherein communications between the first UWA and the first field device comprise monitoring and control functions.

14. The method of claim 12, wherein the first field device comprises an electronic flow meter and the second device comprises a control valve.

15. The method of claim 11, wherein the act of passing occurs such that wireless communications between the first UWA and a controller and wireless communications between the second UWA and the controller are minimized.

16. The method of claim 15, further comprising the act of archiving at least a portion of the communications between the first UWA and the first field device within the first UWA.

17. The method of claim 16, wherein the act of archiving occurs at a frequency of at least once per second.

18. The method of claim 11, wherein the act of passing occurs in response to an alarm condition in the well.

19. The method of claim 11, wherein the act of passing occurs such that the overall power consumed by the first and second UWAs is minimized.

20. The method of claim 11, wherein the second UWA is capable of operating as a redundant backup for the first UWA.

21. A computer readable storage medium, comprising executable code, the executable code comprising the steps of:
determining which of a first UWA and a second UWA is to receive a control token based on an operating state of the well, a comparison of a first level of local communication between the first UWA and a first field device and a second level of local communication between the second UWA and a second field device, or both; and
passing the control token to one of the first or second UWAs based upon the act of determining, wherein the control token includes the ability to control operations of the well.

22. The computer readable storage medium of claim 21, wherein the step of comparing reveals that the first level of communications is greater than the second level of communications and the step of passing includes passing the control token to the first UWA.

23. The computer readable storage medium of claim 22, wherein communications between the first UWA and the first field device comprise monitoring and control functions.

24. The computer readable storage medium of claim 22, wherein the first field device comprises an electronic flow meter and the second device comprises a control valve.

25. The computer readable storage medium of claim 21, wherein the step of passing occurs such that wireless communications between the first UWA and a controller and wireless communications between the second UWA and the controller are minimized.

26. The computer readable storage medium of claim 25, further comprising the step of archiving at least a portion of the communications between the first UWA and the first field device within the first UWA.

27. The computer readable storage medium of claim 26, wherein the step of archiving occurs at a frequency of at least once per second.

28. The computer readable storage medium of claim 21, wherein the step of passing occurs in response to an alarm condition in the well.

29. The computer readable storage medium of claim 21, wherein the step of passing occurs such that the overall power consumed by the first and second UWAs is minimized.

30. The computer readable storage medium of claim 21, wherein the second UWA is capable of operating as a redundant backup for the first UWA.

* * * * *